United States Patent [19]

Watanabe

[11] Patent Number: 5,376,424

[45] Date of Patent: Dec. 27, 1994

[54] VACUUM THERMAL INSULATING PANEL AND METHOD FOR PREPARING SAME

[75] Inventor: Hiroshi Watanabe, Tokyo, Japan

[73] Assignee: Fujimori Kogyo Co., Ltd., Tokyo, Japan

[21] Appl. No.: 955,134

[22] Filed: Oct. 1, 1992

[30] Foreign Application Priority Data

Oct. 2, 1991 [JP] Japan .................................. 3-282086
Oct. 2, 1991 [JP] Japan .................................. 3-282087

[51] Int. Cl.⁵ ........................... B32B 1/04; E04B 1/78
[52] U.S. Cl. ............................ 428/69; 52/406.3;
52/809; 206/524.8; 220/420; 220/421; 220/422;
428/35.8; 428/35.9; 428/71; 428/76; 428/178;
428/212; 428/213; 428/457; 428/462; 428/463;
428/920
[58] Field of Search .................. 428/69, 71, 76, 68,
428/166, 178, 457, 462, 463, 920, 212, 213, 35.8,
35.9; 206/484, 484.4, 524.8; 52/406, 809;
220/420, 421, 422; 383/109, 110

[56] References Cited

U.S. PATENT DOCUMENTS

| | | | |
|---|---|---|---|
| 4,594,279 | 6/1986 | Yoneno | 428/69 |
| 4,726,974 | 2/1988 | Nowobilski | 428/69 |
| 4,798,753 | 1/1989 | Abuaf | 428/69 |
| 5,076,984 | 12/1991 | Bisplingoff | 428/69 |

FOREIGN PATENT DOCUMENTS

| | | |
|---|---|---|
| 0079414 | 11/1981 | European Pat. Off. . |
| 0164793 | 2/1985 | European Pat. Off. . |
| 0181778 | 11/1985 | European Pat. Off. . |
| 0434225 | 11/1990 | European Pat. Off. . |
| 58-50394 | 3/1983 | Japan . |
| 62-39455 | 2/1987 | Japan . |
| 8203821 | 11/1982 | WIPO . |

Primary Examiner—Ellis P. Robinson
Assistant Examiner—Nasser Ahmad
Attorney, Agent, or Firm—Birch, Stewart, Kolasch & Birch

[57] ABSTRACT

A thermal insulating material is packed in a sealing bag composed of an obverse face material and a reverse face material, wherein each of the obverse face material and reverse face material is preferably made of a metal foil having a thickness in the range of 3 to 50 micrometers and which is sandwiched by a sealant layer of plastic film adhesively affixed to one side thereof and by a surface layer of plastic film adhesively affixed to the other side thereof (hereinafter termed a metal foil composite plastic film), and then a similarly constructed metal foil composite plastic film, or preferably one having a number of holes therein, is stuck on the outer surface or inner surface of the obverse face material, to thus obtain a vacuum thermal insulating panel. The vacuum thermal insulating panel thus obtained can prevent permeation of gas from the outside, reflect heat, and prevent heat conduction along the outer surface.

8 Claims, 10 Drawing Sheets

VACUUM THERMAL INSULATING PANEL AND METHOD FOR PREPARING SAME

BACKGROUND OF THE INVENTION

1. Field of the Invention

The present invention relates to a vacuum thermal insulating panel wherein a thermal insulating material is vacuum-packed in a sealing bag composed of an obverse face material and a reverse face material, and a method for preparing the same. More specifically, this invention concerns a vacuum thermal insulating panel capable of preventing gas permeation from the outside, reflecting heat, and reducing thermal conduction along the outer surface thereof, and a method for preparing the same.

2. Description of the Prior Art

Conventionally, as a vacuum thermal insulating panel, there has been disclosed a method for manufacturing a thermal insulating panel in Japanese Patent Laid-open No. Sho 58-50394 (Method for Manufacturing Thermal Insulating Panel), wherein a thermal insulating panel is manufactured by the steps of: charging powder in a gas permeable packing bag; inserting it in an exterior bag, followed by sealing under vacuum. However, the above method has a disadvantage that, when the exterior bag is made of plastic, gas is liable to permeate from the surface of the exterior bag, thus degrading the vacuum degree (thereby increasing the thermal conductivity), and that, when a metal foil is laminated on the exterior bag for preventing gas permeation, the peripheral portion of the thermal insulating panel becomes thermal-conducting, thus degrading the thermal insulating performance.

To solve the above problem, the present applicant has proposed a method of forming an adhesion obstructing layer for obstructing adhesion of a metal foil at a portion to be thermal adhesive-bonded or a thermal adhesive-bonded portion of the exterior bag, and then cutting and removing the metal foil of the portion, as disclosed in Japanese Patent Laid-open No. Sho 62-39455 (Method for Manufacturing Packing Bag); however, this method has a difficulty in mass-production because of its complicated process.

SUMMARY OF THE INVENTION

An object of the present invention is to provide a vacuum thermal insulating panel excellent in gas-proofing property and thermal conduction preventive property. Another object of the present invention is to provide a method for manufacturing the above vacuum thermal insulating panel simply and easily with a low cost.

To achieve the above objects, in a first aspect of the present invention, there is provided a vacuum thermal insulating panel comprising a sealing bag composed of an obverse face material and a reverse face material, and a thermal insulating material which is vacuum-packed in the sealing bag, wherein one of the obverse face material and the reverse face material is made of a metal foil composite plastic film, and the other is made of a metal vacuum evaporation layer composite plastic film, or wherein both of the obverse face material and the reverse face material are made of a metal vacuum evaporation layer composite plastic film.

In the vacuum insulating panel of the present invention, one of the obverse face material and the reverse face material is made of a metal foil composite plastic film and the other is made of a metal evaporation layer composite plastic film, resulting in the thermal conduction being reduced at the periphery of the sealing bag.

The reason for this reduction is not known but it may be that the metal evaporation layer is thin and thus a continuous film is not really formed.

In a second aspect of the present invention, there is provided a method for manufacturing a vacuum thermal insulating panel wherein a thermal insulating material is vacuum-packed in a sealing bag composed of an obverse face material and a reverse face material, and a metal foil composite plastic film is partially affixed to the outer or inner surface of the obverse surface material, the method comprising the steps of: placing the metal foil composite plastic film on the bottom surface of a recessed cavity of a pre-formed die having the cavity and supplying the heated obverse face material above the cavity, or supplying the heated obverse face material above a recessed cavity of a pre-formed die having the cavity and placing the metal foil composite plastic film on the heated obverse face material pressing the obverse face material into a recessed shape having a ring-like jaw portion at its edge, and at the same time, thermally bonding the metal foil composite plastic film onto the outer or inner surface of the obverse face material; packing the thermal insulating material in the recessed portion of said obverse face material; supplying a reverse face material so as to cover the obverse face material; and thermally bonding and sealing the outer peripheral edge of the reverse face material onto the ring-like jaw portion of the obverse face material under vacuum.

The method for manufacturing a vacuum thermal insulating panel according to the present invention comprises the steps of: placing a metal foil composite plastic film on the bottom surface of a recessed cavity of a pre-formed die having a cavity and supplying a heated obverse face material above the cavity, or supplying the heated obverse face material above the cavity and placing the metal foil composite plastic film on the obverse face material; pressing the obverse face material into a recessed shape having a ring-like jaw portion at its edge and, at the same time, thermally bonding the metal foil composite plastic film onto the outer surface or inner surface of the obverse face material. Therefore, in pre-forming the obverse face material of a sealing bag, the metal foil composite plastic film is simultaneously bonded on the outer surface or inner surface of the recessed portion of the pre-formed obverse face material. In this case, the metal foil composite plastic film is not bonded on the ring-like jaw portion, that is, on the bonding portion of the reverse face material but is partially bonded only on the outer surface or inner surface of the recessed portion. Further, the positioning of the partial bonding is executed only by placing the metal foil composite plastic film on the cavity bottom surface of the die or the obverse face material, and accordingly, automation thereof can be easily achieved. Therefore, it is possible to simply and easily manufacture the vacuum thermal insulating panel capable of eliminating thermal conduction at the peripheral portion. Also, the entire procedure thereof can be simplified because of elimination of the step of separately adhering the metal foil composite plastic film.

In a third aspect of the present invention, there is provided a method for manufacturing a vacuum thermal insulating panel wherein a thermal insulating material is vacuum-packed in a sealing bag composed of an obverse face material and a reverse face material, and a metal foil composite plastic film is partially affixed to the outer or inner surface of said obverse face material, the method comprising the steps of: placing the metal foil composite plastic film on the bottom surface of a recessed cavity of a pre-formed die having a cavity and supplying a heated obverse face material having a number of holes in the area where the metal foil composite plastic film is to be affixed above the cavity, or supplying a heated obverse face material having a number of holes in the area where the metal foil composite plastic film is affixed above a recessed cavity of a pre-formed die having a cavity and placing the metal foil composite plastic film on the obverse face material; pressing the obverse face material on the portion corresponding to the periphery of the metal foil composite plastic film into a recessed shape having a ring-like jaw portion at its edge, and at the same time, thermally bonding the periphery of the metal foil composite plastic film onto the outer surface or inner surface of the obverse face material while surrounding a number of holes formed on the obverse face material using the peripheral thermally bonded portion; packing a thermal insulating material in the recessed portion of the obverse face material; supplying a reverse face material so as to cover the obverse face material; and thermally bonding and sealing the outer peripheral edge of the reverse face material onto the ring-like jaw portion of the obverse face material under vacuum.

This preparation method comprises the steps of using the obverse face material having a number of holes in the area where a metal foil composite plastic film is to be affixed, thermally bonding the periphery of the metal foil composite plastic film onto the outer surface or inner surface of the obverse face material, and surrounding the number of holes formed on the obverse face material using the thermally bonded peripheral portion. Accordingly, in packing the thermal insulating material in the recessed portion and thereafter thermally bonding the outer periphery of the reverse face material onto the jaw portion of the obverse face material under vacuum, the air existing between the obverse face material and the metal foil composite plastic film can be discharged through the holes of the obverse face material (in the case the metal foil composite plastic film is bonded onto the outer surface of the obverse face material), or the air existing between the obverse face material and the metal foil composite plastic film can be communicated to the outside (in the case that the metal foil composite plastic film is bonded onto the inner surface of the obverse face material). Consequently, in either case, air is never enclosed between the obverse face material and the metal foil composite plastic film in the resulting vacuum thermal insulating panel. Further, the holes of the obverse face material are surrounded by a thermally bonded periphery of the metal foil composite plastic film. In either case the metal foil composite plastic film is affixed to the outside or the inside of the obverse face material, thereby cutting off the communication of the holes to the inside of the panel and eliminating the possibility of air flow from the outside to the inside of the panel. Therefore, according to the present invention, there occurs no trouble due to the presence of air enclosed between the obverse face material and the metal foil composite plastic film. Namely, if air exists between the obverse face material and the metal foil composite plastic film when thermally bonding the whole surface of the metal foil composite plastic film to the obverse face material, the presence of the air tends to obstruct the preferable whole surface bonding. However, the holes of the obverse face material release the air to the outside while pressing with a press, and this eliminates the risk of air bubbles obstructing the thermal bonding. Further, only the periphery of the vacuum thermal insulating panel is thermally bonded, which also eliminates the fear of obstructing the thermally bonding. Particularly, in the case that the metal foil composite plastic film is disposed outside the obverse face material, when enclosed air exists between the obverse face material and the metal foil composite plastic film, the enclosed air is made to flow inside the vacuum thermal insulating panel with time thus degrading the thermal insulating performance. However, in the vacuum thermal insulating panel according to the present third method, the enclosed air is eliminated, and therefore, there is not generated such a disadvantage. Thus, there can be obtained a vacuum thermal insulating panel with improved thermal insulating property.

In the preparation methods of the second and third aspects of the present invention, both of the obverse face material and the reverse face material may be made of a metal foil composite plastic film, although it is preferred that at least one of them is made of a metal evaporation layer composite plastic film.

DETAILED DESCRIPTION OF THE PREFERRED EMBODIMENT

One embodiment of the present invention will be described with reference to FIG. 1. In this figure, numeral 1 indicates an obverse face material. The obverse face material 1 is formed by lamination of a sealant layer 5 on a surface layer 3 having an evaporation layer 2 on its inner surface through an adhesive layer 4. The metal evaporation layer 2 can be obtained by evaporation of a metal such as aluminum on the surface layer 3 by a known method. The thickness of the metal evaporation layer 2 is within a range from 300 to 1000 Å, preferably, from 500 to 800 Å. As the surface layer 3, there can be adopted a heat resisting plastic film such as polyester, polyamide, or polypropylene. The thickness of the plastic film is usually within a range from 5 to 40 $\mu$m. In addition, the surface layer 3 may be a single layer or composite layer of these plastic films. As the sealant layer 5, there can be adopted a plastic film having a thickness of 15 to 300 $\mu$m, such as polyethylene, polypropylene, ethylene-vinyl copolymer or polyacrylonitrile. Particularly, in the view point of providing a gas proofing property and resistance against remaining freon gas in using the freon gas as a foaming agent in manufacturing a filler, polyacrylonitrile is preferably used. In order to bond the surface layer 3 to the sealant layer 5, there can be used a known adhesive such as a urethane adhesive or isocyanate adhesive.

Numeral 6 indicates a reverse face material. The reverse face material 6 is formed by lamination of a sealant layer 10 and a surface layer 11 on both sides of a metal foil 7 through adhesive layers 8 and 9, respectively. In this case, the sealant layer 10 and the surface layer 11 can be respectively formed to the same thicknesses using the same materials as the sealant layer 5 and the surface layer 3 of the obverse face material 1. As the metal foil 7, there can be used the same metal as the metal evaporation layer 2, preferably, aluminum. The thickness of the metal foil 7 is within a range from 3 to 50 $\mu$m, preferably, from 5 to 20 $\mu$m.

Numeral 12 indicates a thermal insulating material. As the thermal insulating material 12, there can be used powder of perlite, white carbon, polystyrene foam, sintered polyethylene or the like accommodated in a gas permeable bag. A polyurethane foam block can also be used. Among them, sintered polyethylene powder has a small heat conductivity compared with perlite and white carbon (sintered polyethylene: $\lambda=0.003$, perlite, white carbon: $\lambda=0.007$). Further, although conventional polyethylene foam is unsuitable because bubbles thereof are crushed in vacuum, the sintered polyethylene has bubbles which are hard and continuous and not crushed in a vacuum. Therefore, sintered polyethylene is particularly preferable as a thermal insulating material.

Figure 1:
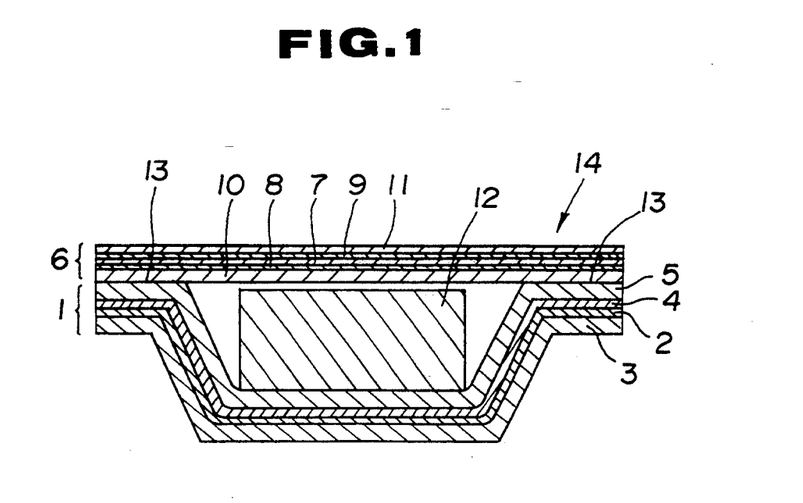
FIG. 1 is a cross-sectional view showing one embodiment of the present invention.

In the vacuum thermal insulating panel according to the embodiment as shown in FIG. 1, the whole periphery of the sealant layer of the obverse face material 1 is thermally bonded (13, 13) to the whole periphery of the sealant layer 10 of the reverse face material 6. Thus a sealing bag 14 is formed and the thermal insulating material 12 is vacuum-packed in the sealing bag 14.

In this case, the thermally bonded portions 13 and 13 come close to each other, and consequently, when the obverse face material and the reverse face material are respectively made of a metal foil laminated film, there would normally be generated a large thermal conduction at the thermally bonded portions 13 and 13. However, since the obverse face material 1 is made of a metal evaporation film and the reverse face material 6 is made of a metal foil laminated film, a large thermal conduction at the thermally bonded portions 13 and 13 is avoided.

In contrast to the embodiment as shown in FIG. 1, the obverse face material 1 and the reverse face material 6 may be made of a metal foil laminated film and a metal evaporation layer film, respectively.

Also, in the embodiment as shown in FIG. 1, the metal foil of the reverse face material 6 is replaced by a metal evaporation layer, and thus the obverse face material and the reverse face material may be made of a metal evaporation layer film.

Figure 2:
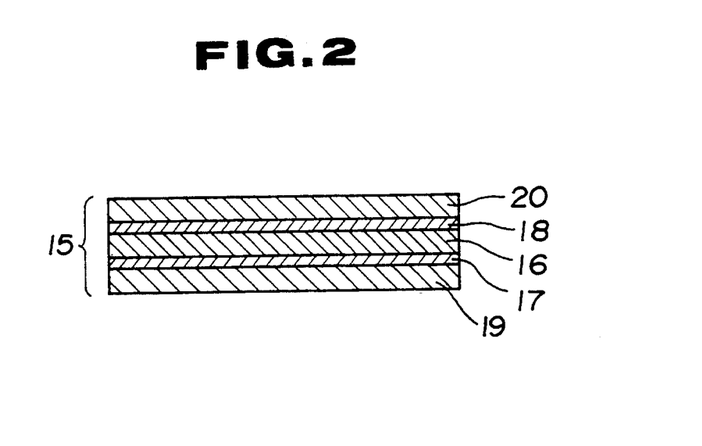
FIG. 2 is a cross-sectional view showing one example of a metal foil composite plastic.
Figure 3:
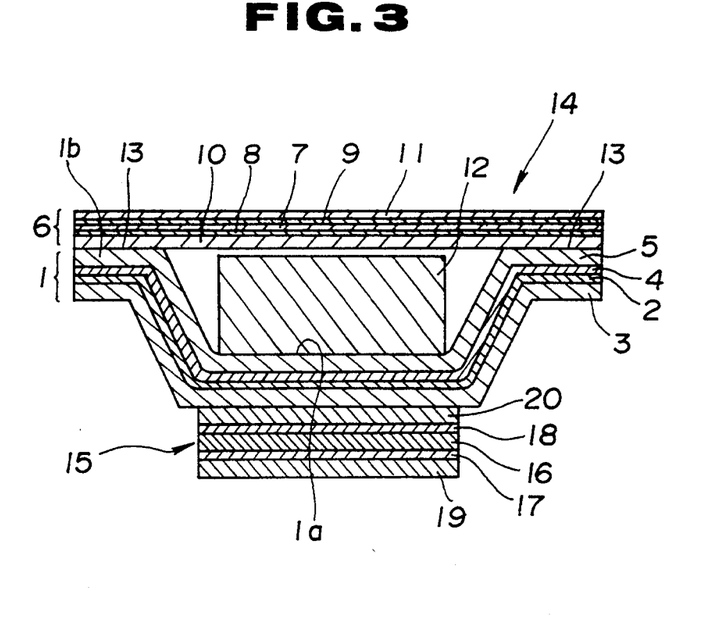
FIG. 3 is a cross-sectional view showing another embodiment of the present invention.
Figure 4:
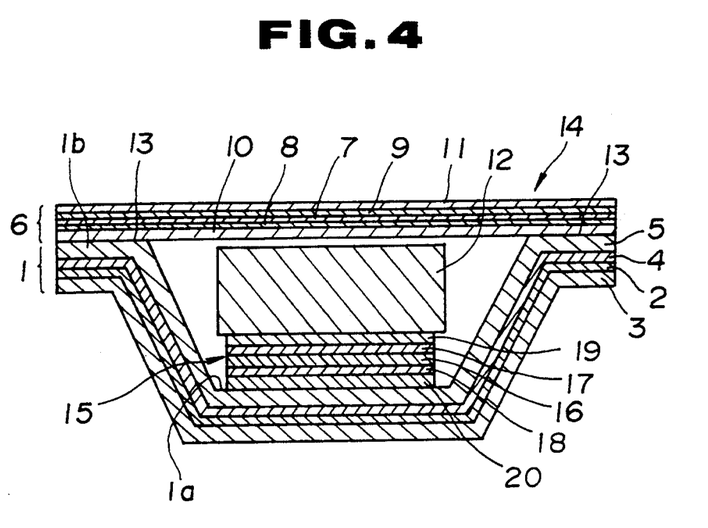
FIG. 4 is a cross-sectional view showing a further embodiment of the present invention.

Further, the metal foil composite plastic film 15 having such a construction as shown in FIG. 2 may be affixed to the outer surface or inner surface other than the above thermal adhesive-bonded portions 13 and 13 of the obverse face material 1, as shown in FIGS. 3 and 4, thereby obtaining a vacuum thermal insulating panel excellent in a thermal reflecting property. The film 15 is formed by respectively laminating a surface layer 19 and sealant layer 20 on both sides of a metal foil 16 such as aluminum through adhesive layers 17 and 18. The surface layer 19 and the sealant layer 20 can be formed to the same thicknesses with use of the same materials as the above surface layer 3 or 11, and the sealant layer 5 or 10. In this case, when a film having a thermal adhesive property such as polyester or nylon as the obverse face material 1, is employed ethylene-ethylacrylate copolymer resin graft-modified by silane is preferably used for the sealant layer 20.

Figure 5:
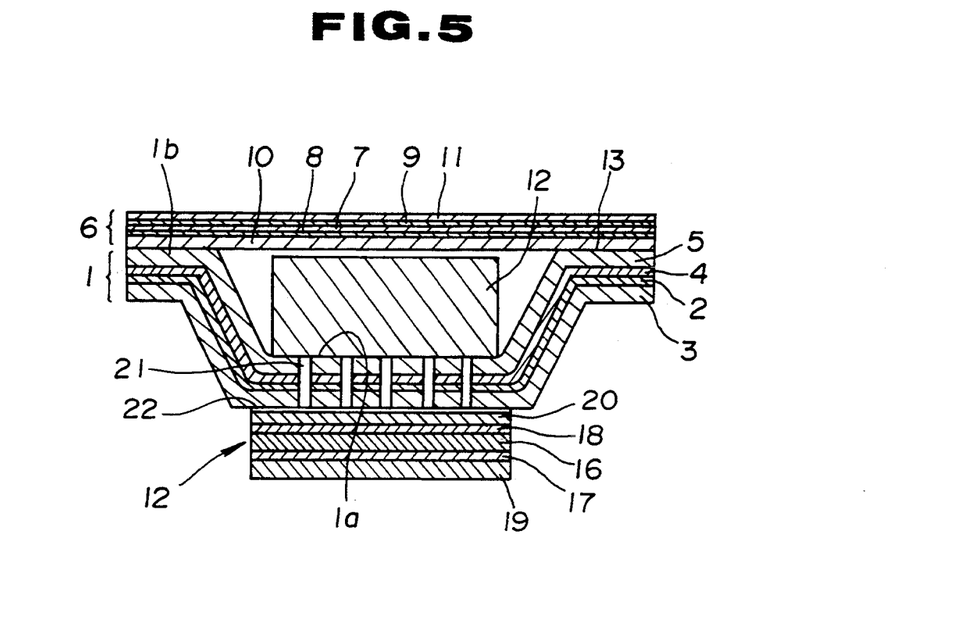
FIG. 5 is a cross-sectional view showing a still further embodiment of the present invention.
Figure 6:
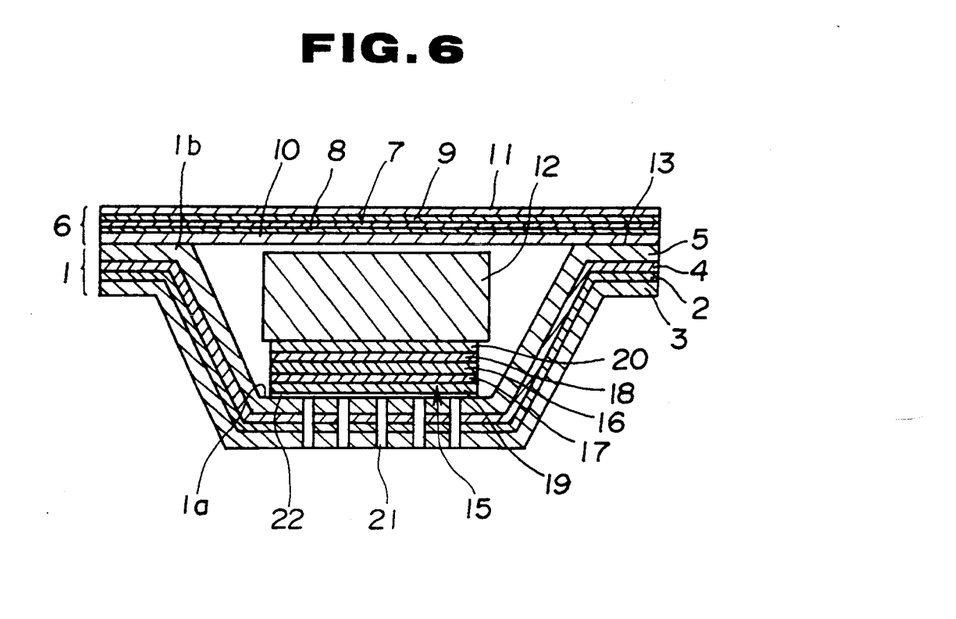
FIG. 6 is a cross-sectional view showing an additional embodiment of the present invention.

In addition, the metal foil composite plastic film 15 may be thermally bonded on the entire inner surface or outer surface of the heated obverse face material, or only at the periphery. In this case, as shown in FIGS. 5 and 6, it is preferably bonded at the periphery of the outer surface or inner surface of the obverse face material which has holes 21 within the area where the metal foil composite plastic film 15 is affixed. In the case of using the obverse face material having the above holes, the bore diameter of the holes is preferably in the range from 1 to 30 mm, more preferably from 5 to 20 mm. The density of the holes is preferably in the range from 1 to 20 pieces/10 cm², more preferably, from 2 to 5 pieces/10 cm².

In a vacuum thermal insulating panel as shown in FIG. 5, a metal foil composite plastic film 15 is disposed on the outer surface of the obverse face material 1 having a number of holes 21 in the area where the metal foil composite plastic film 15 is affixed so as to surround these holes 21, and only the peripheral portion is thermally bonded (22). Further, in a vacuum thermal insulating panel as shown in FIG. 6, a metal foil composite plastic film 15 is disposed on the inner surface of the obverse face material 1 having a number of holes 21 in the area where the metal foil composite plastic film 15 is affixed so as to surround these holes 21, and only the peripheral portion is thermal adhesive-bonded (22).

Figure 7:
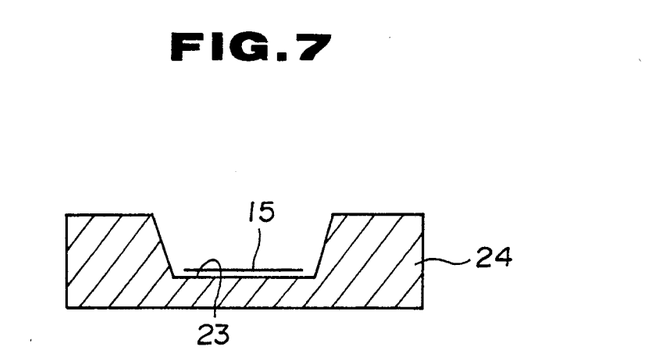
FIG. 7 is a schematic cross-sectional view showing the state where a metal foil composite plastic film is placed in a cavity of pre-formed die in manufacturing the vacuum thermal insulating panel as shown in FIG. 3.
Figure 8:
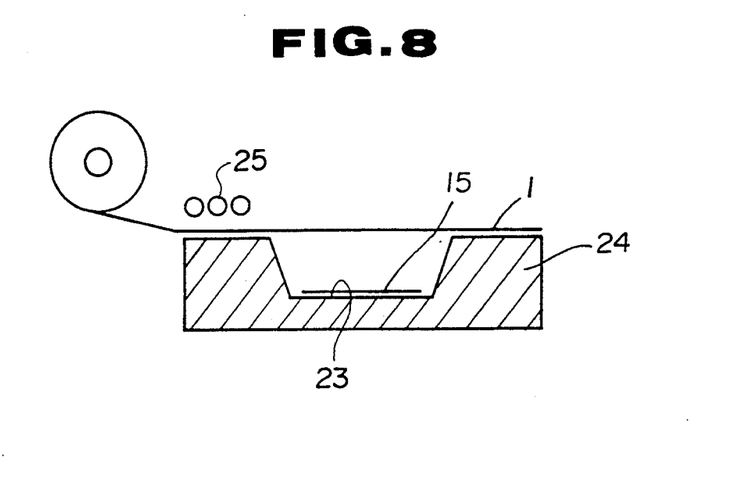
FIG. 8 is a schematic cross-sectional view showing the state where an obverse face material is supplied in the same example as shown in FIG. 7.
Figure 9:
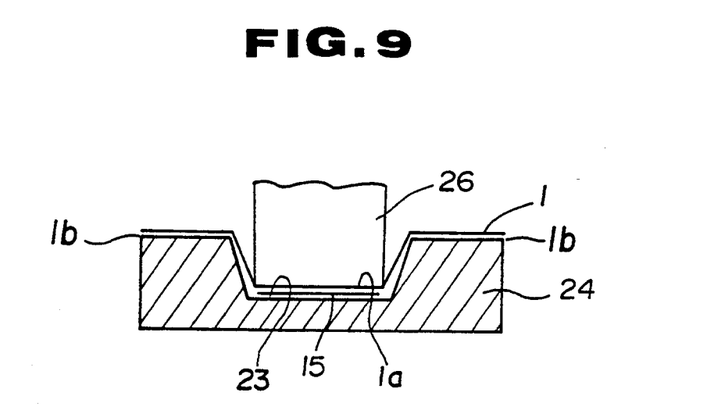
FIG. 9 is a schematic cross-sectional view showing the state where the obverse face material is pressed in the same example as shown in FIG. 7.

In manufacturing a vacuum thermal insulating panel as shown in FIG. 3, a metal foil composite plastic film 15 is placed on the bottom surface of a recessed cavity 23 of a pre-foaming die 24 having the cavity 23 with the surface layer 19 directed downwardly, as shown in FIG. 7. Subsequently, the obverse face material 1 which 1 is heated at a temperature of a softening point of the obverse face material 1 or more by a heater 25 is supplied above the cavity 23 with the surface layer 3 directed downwardly, as shown in FIG. 8. Thereafter, as shown in FIG. 9, the heated obverse face material 1 is pressed by a press 26 onto the bottom surface of the cavity 23. Thereby, the obverse face material 1 is formed in a recessed shape corresponding to the shape of the cavity 23, and at the same time, the heated obverse face material 1 is pushed onto the above film 15 by the press 26, so that the film 15 is brought in press-contact with the obverse face material 1, and the sealant layer 20 (FIG. 2) of the film 15 is thermally bonded onto the surface layer 3 of the obverse face material 1. Then, the one end portion of the obverse face material 1 is cut at the suitable position, and the upper end portion of the recessed portion 1a is formed with a ring-like upper jaw 1b.

Figure 10:
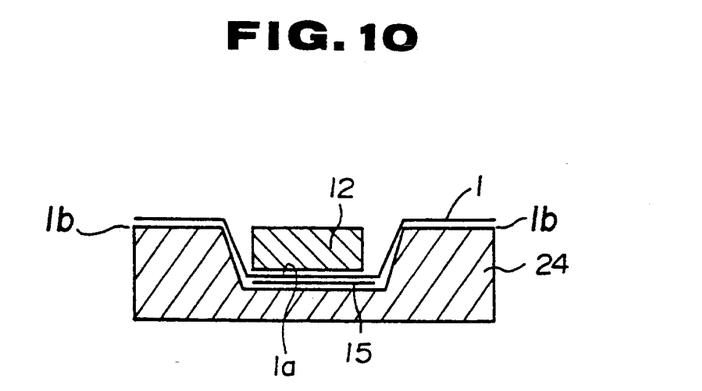
FIG. 10 is a schematic cross-sectional view showing the state where a thermal insulating material is supplied in the same example as shown in FIG. 7.

Next, as shown in FIG. 10, the thermal insulating material 12 is packed in the recessed portion 1a of the obverse face material 1, after which the reverse face material 6 (not shown) is supplied above the thermal insulating material 12 with the sealant layer 11 thereof directed downwardly. Then, the ring-like upper jaw portion 1b except for a part thereof is thermally bonded, and the one end portion of the reverse face material 6 (not shown) is cut. The obtained panel is inserted in a vacuum sealing machine (not shown), and the non-bonded portion of the ring-like upper jaw 1b of the obverse face material 1 is thermally bonded to the reverse face material 6 in a vacuum, thus forming a sealing bag while keeping the interior in vacuum. Consequently, there can be obtained a vacuum thermal insulating panel wherein the thermal insulating material 12 is vacuum-packed in the sealing bag, and the metal foil composite plastic film 15 is partially affixed on the outer surface thereof.

In a process as shown in FIG. 10, one or more kinds of getter agents such as activated carbon, calcium chloride, calcium hydroxide, zeolite and the like may be packed in the recessed portion 1a of the obverse face material 1 together with the thermal insulating material 12, as required.

Figure 12:
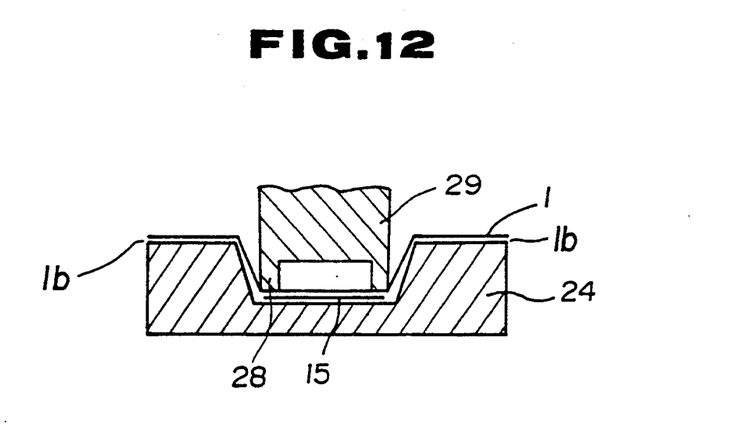
FIG. 12 is a schematic cross-sectional view showing the state where an obverse face material is pressed in manufacturing the vacuum insulating panel as shown in FIG. 5.

A method for manufacturing a vacuum thermal insulating panel as shown in FIG. 5 is the same as the above-mentioned embodiment, except for the following point. In a pressing and thermal bonding process of the above embodiment a press 29 (as shown in FIG. 12) wherein the lower peripheral surface portion has a ring-like projection portion 28 is used in lieu of the press 26 as shown in FIG. 9. Thus the periphery of the metal foil composite plastic film 15 is thermally bonded on the obverse face material 1.

According to this method, a number of holes 21 (as shown in FIG. 5) are formed in the area where the metal foil composite plastic film 15 is affixed to the obverse face material. Even if air exists between the obverse face material 1 and the film 15 in thermal bonding of the obverse face material 1 to the film 15, the air is not enclosed, and consequently, there is never generated obstruction of the thermal bonding. Also, even if air remains between the obverse face material 1 and the film 15 after thermal bonding, the air is purged together with the internal air during purging the internal air in the vacuum sealing machine, so that there never remains air between the obverse face material 1 and the film 15 in the resulting vacuum thermal insulating panel. This eliminates such a trouble as reducing of the internal vacuum degree and lowering the thermal insulating performance due to permeation of the remaining air into the panel. Further, since the above holes 21 are covered with the film 15, and the periphery of the film 15 is thermally bonded (22) onto the obverse face material 1, they are never exposed on the outside, and accordingly, air is less liable to permeate to the interior through the above holes 21.

The other functional effect of the vacuum thermal insulating panel of the embodiment as shown in FIG. 5 is the same as that as shown in FIG. 3, and therefore, the explanation thereof is omitted.

Figure 11:
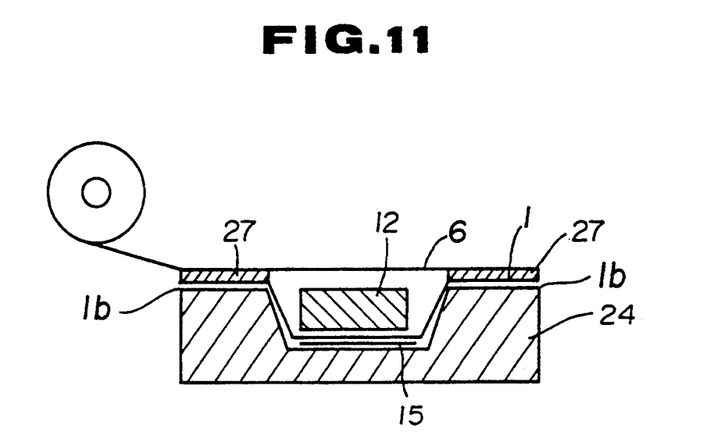
FIG. 11 is a schematic cross-sectional view showing the state where a reverse face material is supplied in the same example as shown in FIG. 7.
Figure 13:
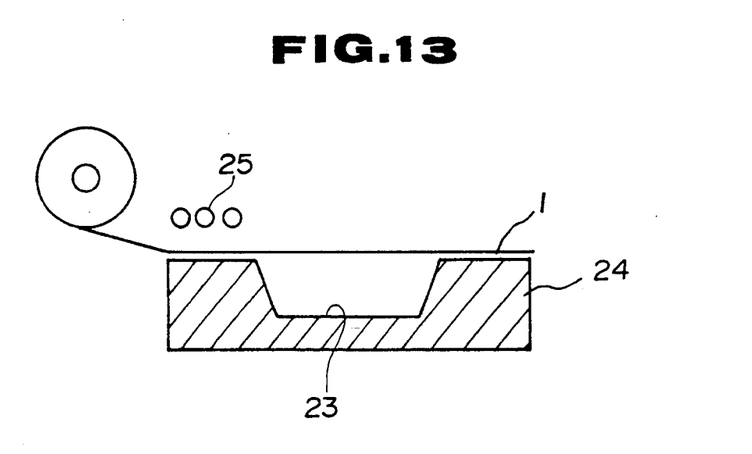
FIG. 13 is a schematic cross-sectional view showing the state where an obverse face material is supplied to the cavity of pre-formed die in manufacturing the vacuum thermal insulating panel as shown in FIG. 4.
Figure 14:
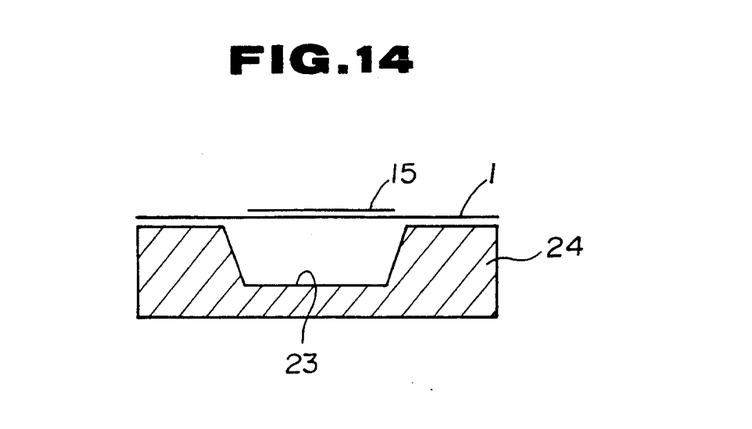
FIG. 14 is a schematic cross-sectional view showing the state where the metal foil composite plastic film is placed on the obverse face material in manufacturing the vacuum thermal insulating panel as shown in FIG. 4.
Figure 15:
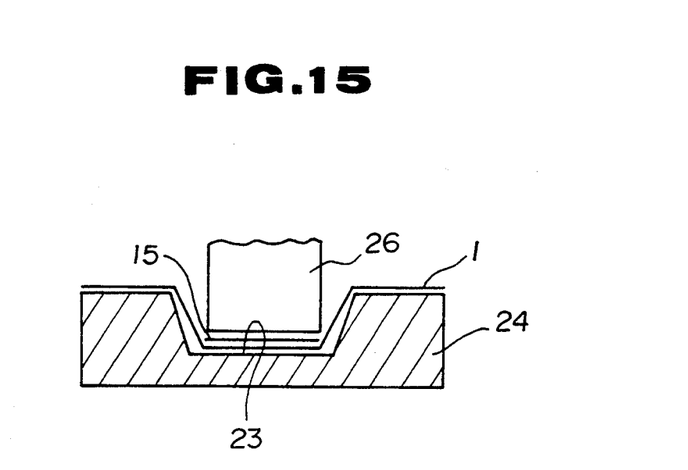
FIG. 15 is a schematic cross-sectional view showing the state where the metal foil composite plastic film and the obverse face material are pressed in manufacturing the vacuum thermal insulating panel as shown in FIG. 4.
Figure 16:
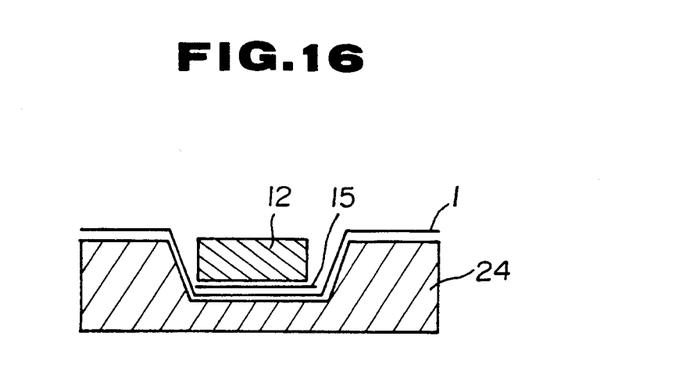
FIG. 16 is a schematic cross-sectional view showing the state where the thermal insulating material is supplied in manufacturing the vacuum thermal insulating panel as shown in FIG. 4.
Figure 17:
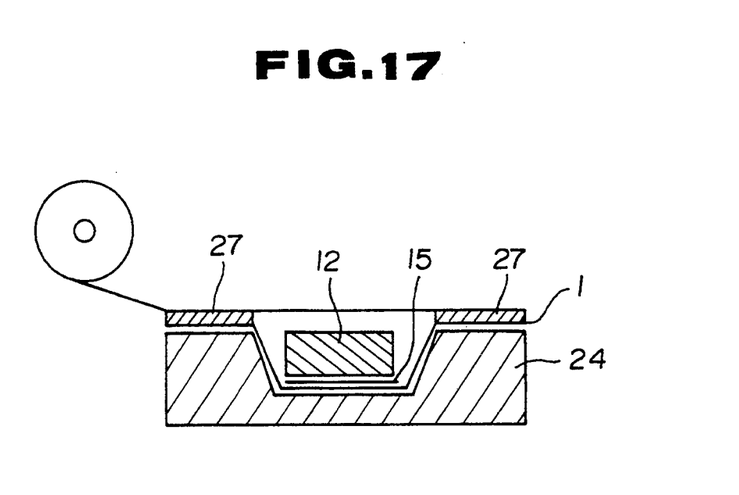
FIG. 17 is a schematic cross-sectional view showing the state where the reverse face material is supplied in manufacturing the vacuum thermal insulating panel as shown in FIG. 4.

In manufacturing a vacuum thermal insulating panel as shown in FIG. 4, the obverse face material 1 is heated at or above a temperature of a softening point of the obverse face material 1 by the heater 25 which is supplied above the recessed cavity of the pre-forming die 24 having the cavity, as shown in FIG. 13. Then, as shown in FIG. 14, the metal foil composite plastic film 15 is placed on the obverse face material 1, is pressed, and is then thermally bonded. Subsequently, the processes as shown in FIGS. 16 and 17, that is, the same processes as shown in FIGS. 10 and 11 are repeated to obtain the vacuum thermal insulating panel in which the thermal insulating material 12 is vacuum-packed in the sealing bag and the metal foil composite plastic film 15 is partially bonded onto the inner surface of the obverse face material 1.

Figure 18:
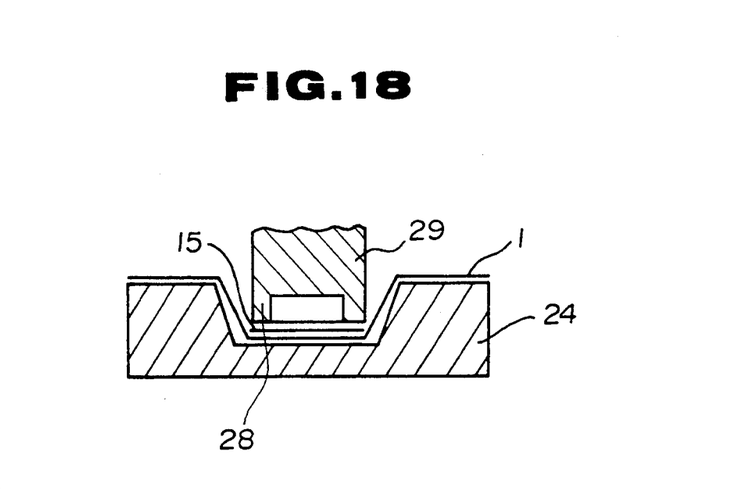
FIG. 18 is a schematic cross-sectional view showing the state where the obverse face material is pressed in manufacturing the vacuum thermal insulating panel as shown in FIG. 6.
Figure 19:
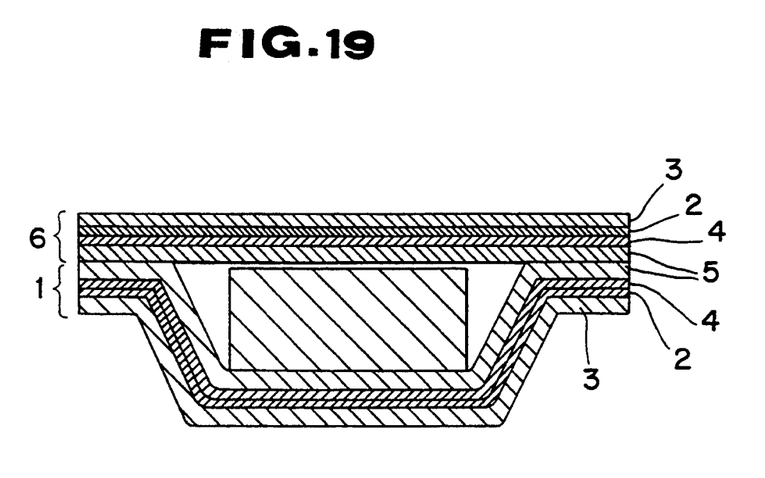
FIG. 19 is a schematic cross-sectional view showing another embodiment of the present invention.

A method for manufacturing a vacuum thermal insulating panel as shown in FIG. 6 is the same as the embodiment as shown in FIG. 4, except that, as shown in FIG. 18, the same press 29 as shown in FIG. 12 is used in the pressing and thermal bonding process as illustrated in FIG. 19, each of the obverse face material 1 and the reverse face material 6 may be made of a metal evaporation layer 2 on the surface layer 3, wherein the layers 2-5 correspond to those shown in FIG. 1.

The effect of the vacuum thermal insulating panel of the embodiment as shown in FIG. 4 or 6 is the same as that as shown in FIG. 3 or 5, and therefore, the explanation thereof is omitted.

In the vacuum thermal insulating panel manufactured in the above-mentioned process, thermal conductivity is low and the deterioration of the vacuum degree with time is made very small, as shown in the following examples.

[EXAMPLE 1]

Construction of Obverse Face Material
Surface layer: polyester film on which aluminum is evaporated in vacuum, 12 μm
Sealant layer: acrylonitrile (Zecron film manufactured by Mitsui Toatsu Chemical), 50 μm
Adhesive layer: urethane adhesive, 2 μm
Construction of Reverse Face Material
Surface layer: polyester film, 25 μm
Metal foil: aluminum, 10 μm
Sealant layer: acrylonitrile (Zecron film manufactured by Mitsui Toatsu Chemical), 50 μm
Adhesive layer: urethane adhesive, 2 μm
Construction of Metal Foil Composite Plastic Film
Surface layer: polyester film, 12 μm
Adhesive layer: urethane adhesive, 10 μm
Metal foil: aluminum, 10 μm
Sealant layer: ethylene-ethylacrylate copolymer resin, 50 μm (laminated by a melt extrusion laminating method)
Dimension: 400 mm×400 mm
Thermal Insulating Material
Polyurethane foam plate: thickness 15 mm With use of the above materials, a vacuum thermal insulating panel (420 mm×440 mm) was manufactured in the processes as shown in FIGS. 7 to 11. In this case, a cavity bottom surface of a pre-formed die has an area of 400 mm×400 mm, and a depth of 15 mm.

Further, the vacuum sealing was executed under a vacuum degree of $10^{-2}$ Torr.

Table 1 shows the vacuum degree and thermal conductivity with time in the vacuum thermal insulating panel thus obtained.

The vacuum thermal insulating panel obtained by bonding a metal foil composite plastic film on the inner surface of the obverse face material obtained in the process as shown in FIGS. 13 to 17 shows the same effect.

[EXAMPLE 2]

The same experiment was repeated, except for using the obverse face material 1 having holes with a bore diameter of 10 mm, and a density of 2 pieces/10 cm² in the range where the metal foil composite plastic film is affixed. The vacuum thermal insulating panel thus obtained was measured in the same manner as in Example 1. The results are shown in Table 1.

TABLE 1

|  |  | Vacuum degree (Torr) | Thermal conductivity (kcal/m · hr · °C.) |
|---|---|---|---|
| Example 1 | after one month | $1 \times 10^{-2}$ | 0.003 |
|  | after one year | $2 \times 10^{-2}$ | 0.003 |
|  | after two years | $3 \times 10^{-2}$ | 0.003 |
| Example 2 | after one month | $1 \times 10^{-2}$ | 0.003 |
|  | after one year | $2 \times 10^{-2}$ | 0.003 |
|  | after two years | $3 \times 10^{-2}$ | 0.003 |

What is claimed is:

1. A vacuum thermal insulating panel comprising a sealing bag formed of an obverse face material and a reverse face material having the outer peripheral edge of the reverse face and observe face materials thermally bonded and sealed to each other, and a thermal insulating material which is vacuum-packed in said sealing bag, wherein one of said obverse face material and said reverse face material includes a metal foil having a thickness in the range of 3 to 50 micrometers and which is sandwiched by a sealant layer of plastic film adhesively affixed to one side thereof and by a surface layer of plastic film adhesively affixed to the other side thereof and the other includes a metal evaporation layer having a thickness in the range of 300 to 1000 Angstroms and which is sandwiched by a sealant layer of plastic film adhesively affixed to one side thereof and by a surface layer of plastic film adhesively affixed to the other side thereof.

2. A vacuum thermal insulating panel comprising a sealing bag formed of an obverse face material and a reverse face material having the outer peripheral edge of the reverse face and obverse face materials thermally bonded and sealed to each other, and a thermal insulating material which is vacuum-packed in said sealing bag, wherein each of said obverse face material and said reverse face material is made of a metal evaporation layer having a thickness in the range of 300 to 1000 Angstroms and which is sandwiched by a sealant layer of plastic film adhesively affixed to one side thereof and by a surface layer of plastic film adhesively affixed to the other side thereof, and wherein said thermal insulating material is a sintered polyethylene.

3. The vacuum thermal insulating panel of claim 1, wherein said sealant layer which is adhesively affixed to said metal foil is partially adhered to an outer surface or an inner surface of said obverse face material.

4. A vacuum thermal insulating panel of claim 1 or 2, wherein said metal evaporation layer having a thickness in the range of 300 to 1000 Angstroms and which is sandwiched by a sealant layer of plastic film adhesively affixed to one side thereof and by a surface layer of plastic film adhesively affixed to the other side thereof is an aluminum evaporation layer.

5. A vacuum thermal insulating panel of claim 1, wherein said thermal insulating material is a sintered polyethylene.

6. The vacuum thermal insulating panel of claim 2, where said sealant layer which is adhesively affixed to said metal evaporation layer is partially adhered to an outer surface or an inner surface of said obverse face material.

7. A vacuum thermal insulating panel comprising a sealing bag formed of an obverse face material having the outer peripheral edge of the reverse face and observe face materials thermally bonded and sealed to each other and a reverse face material, and a thermal insulating material which is vacuum-packed in said sealing bag, wherein each of said obverse face material and said reverse face material is made of a metal evaporation layer having a thickness in the range of 300 to 1000 Angstroms and which is sandwiched by a sealant layer of plastic film adhesively affixed to one side thereof and by a surface layer of plastic film adhesively affixed to the other side thereof, and wherein an additional laminate of a metal foil having a thickness in the range of 3 to 50 micrometers and which is sandwiched by a sealant layer of plastic film adhesively affixed to one side thereof and by a surface layer of plastic film adhesively affixed to the other side thereof is partially adhered to an outer surface or an inner surface of said obverse face material.

8. A vacuum thermal insulating panel comprising a sealing bag formed of an obverse face material and a reverse face material, and a thermal insulating material which is vacuum-packed in said sealing bag,
wherein each of said obverse face material and said reverse face material is made of a metal evaporation layer having a thickness in the range of 300 to 1000 Angstroms and which is sandwiched by a sealant layer of plastic film adhesively affixed to one side thereof and by a surface layer of plastic film adhesively affixed to the other side thereof,
wherein an additional laminate of a metal foil having a thickness in the range of 3 to 50 micrometers and which is sandwiched by a sealant layer of plastic film adhesively affixed to one side thereof and by a surface layer of plastic film adhesively affixed to the other side thereof is partially adhered to an outer surface or an inner surface of said obverse face material, and
wherein said thermal insulating material is a sintered polyethylene.

* * * * *